US008923216B2

(12) United States Patent
Luo et al.

(10) Patent No.: US 8,923,216 B2
(45) Date of Patent: Dec. 30, 2014

(54) ROBUST DECODING OF COMP TRANSMISSIONS

(75) Inventors: Tao Luo, San Diego, CA (US); Durga Prasad Malladi, San Diego, CA (US); Juan Montojo, San Diego, CA (US); Ke Liu, San Diego, CA (US); Xiaoxia Zhang, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 12/846,640

(22) Filed: Jul. 29, 2010

(65) Prior Publication Data

US 2011/0038330 A1     Feb. 17, 2011

Related U.S. Application Data

(60) Provisional application No. 61/230,068, filed on Jul. 30, 2009.

(51) Int. Cl.
| | |
|---|---|
| *H04W 72/04* | (2009.01) |
| *H04W 4/00* | (2009.01) |
| *H04B 7/02* | (2006.01) |
| *H04B 7/04* | (2006.01) |

(52) U.S. Cl.
CPC ............. *H04B 7/024* (2013.01); *H04B 7/0413* (2013.01)
USPC ........ 370/329; 370/328; 370/312; 455/422.1; 455/456.1

(58) Field of Classification Search
USPC ............... 370/329, 328, 242, 331; 455/456.1, 455/450, 422.1
See application file for complete search history.

(56) References Cited

U.S. PATENT DOCUMENTS 5,966,402 A * 10/1999 Yamamoto .................... 375/150
8,442,566 B2 * 5/2013 Liu et al. ....................... 455/509
(Continued)

FOREIGN PATENT DOCUMENTS

| CN | 1158068 A | 8/1997 |
|---|---|---|
| CN | 101296013 A | 10/2008 |
| WO | WO2008103317 | 8/2008 |

OTHER PUBLICATIONS

3GPP: "3rd Generation Partnership Project;Technical Specification Group Radio Access Network;Further Advancements for E-UTRAPhysical Layer Aspects(Release 9)", 3GPP Draft; TR 36.814 110, 3rd Generation Partnership Project (3GPP), Mobile Competence Centre ; 650, Route Des Lucioles ; F-06921 Sophia-Antipolis Cedex ; France, No. San Francisco, USA; 20090509, May 9, 2009, pp. 1-34, XP050339706, [retrieved on May 9, 2009].

(Continued)

*Primary Examiner* — Rasheed Gidado (57) ABSTRACT

Techniques for transmitting data and resource signals (RS) are provided. According to certain aspects, an access point may determine RS resource locations related to one or more access points in a CoMP set transmitting a common reference signal (CRS), map data transmissions initially over resources other than those related to the RS resource locations, and map remaining data transmissions over resources related to the RS resource locations. According to certain aspects, a wireless device may receive a signal from access points in a coordinated multiple point (CoMP) communication set comprising a common reference signal (CRS) superimposed over data, determine CRS locations in the signal that correspond to the CRS, and decode data from the signal based at least in part on the determined CRS locations.

40 Claims, 4 Drawing Sheets

(56) References Cited

U.S. PATENT DOCUMENTS

| | | | | |
|---|---|---|---|---|
| 2002/0039356 | A1* | 4/2002 | You et al. | 370/331 |
| 2008/0268887 | A1* | 10/2008 | Jansen et al. | 455/503 |
| 2009/0034659 | A1* | 2/2009 | Beaulieu et al. | 375/340 |
| 2010/0080323 | A1* | 4/2010 | Mueck et al. | 375/296 |
| 2010/0177746 | A1* | 7/2010 | Gorokhov et al. | 370/336 |
| 2010/0189038 | A1* | 7/2010 | Chen et al. | 370/328 |
| 2010/0285792 | A1* | 11/2010 | Chen et al. | 455/422.1 |
| 2011/0274047 | A1* | 11/2011 | Kwon et al. | 370/328 |
| 2011/0292903 | A1* | 12/2011 | Jongren et al. | 370/329 |

OTHER PUBLICATIONS

Huawei, et al., "Further Discussions on the Downlink Coordinated Transmission—Impact on the Radio Interface", 3GPP Draft, R1-090129 Further Discussions on Downlink Coordinated Transmission, 3rd Generation Partnership Project (3GPP), Mobile Competence Centre, 650, Route Des Lucioles, F-06921 Sophia-Antipolis Cedex, France, No. Ljubljana, 20090107, Jan. 7, 2009, XP050318067.
Huawei, Qualcomm Europe, RITT, CMCC: Solutions for DL CoMP Transmission—For Issues on Control Zone, CRS and DRS, 3GPP TSG RAN WGI meeting Feb. 9, 2009, pp. 1-9, XP002627726, Athens, Greece Retrieved from the Internet: URL:http://ftp.3gpp.org/specs/html-info/TD ocExMtg-R1-56-27291.htm [retrieved on Mar. 10, 2011].
International Search Report and Written Opinion—PCT/US2010/044014, International Search Authority—European Patent Office—Apr. 5, 2011.
LG Electronics: "Downlink Reference Signal for Higher Order MIMO" 3GPP Draft; R1-090218_LGE_DL-RS, 3rd Generation Partnership Project (3GPP), Mobile Competence Centre ; 650, Route Des Lucioles ; F-06921 Sophia-Antipolis Cedex ; France, No. Ljubljana; 20090108, Jan. 8, 2009, XP050318148 [retrieved on Jan. 8, 2009] p. 3, line 28-line 33.
Qualcomm Europe: "RS Structure in Support of Higher-order MIMO", 3GPP Draft, R1-091450 DL-RS, 3rd Generation Partnership Project (3GPP), Mobile Competence Centre, 650, Route Des Lucioles, F-06921 Sophia-Antipolis Cedex, France, No. Seoul, Korea, 20090318, Mar. 18, 2009, XP050339020, [retrieved on Mar. 18, 2009].
Samsung: "Design Considerations for COMP Joint Transmission", 3GPP Draft, R1-091868 Design Considerations for Comp Joint Transmission, 3rd Generation Partnership Project (3GPP), Mobile Competence Centre, 650, Route Des Lucioles, F-06921 Sophia-Antipolis Cedex, France, No. San Francisco, USA, 20090428, Apr. 28, 2009, XP050339364, [retrieved on Apr. 28, 2009].
Texas Instruments: "Multiplexing and Signaling Support for Downlink COMP", 3GPP Draft, R1-091292 TI DL COMP, 3rd Generation Partnership Project (3GPP), Mobile Competence Centre, 650, Route Des Lucioles, F-06921 Sophia-Antipolis Cedex, France, No. Seoul, Korea, 20090318, Mar. 18, 2009, XP050338899, [retrieved on Mar. 18, 2009].
ZTE, "Resource Mapping Issues on JP transmission in CoMP", 3GPP Draft, R1-090070 Resource Mapping Issues on JP Transmission in COMP, 3rd Generation Partnership Project (3GPP), Mobile Competence Centre , 650, Route Des Lucioles , F-06921 Sophia-Antipolis Cedex , France, No. Ljubljana, 20090107, Jan. 7, 2009, XP050318014.
Taiwan Search Report—TW099125462—TIPO—Aug. 10, 2013.
Motorola: "Common Reference Symbol Mapping/Signaling for 8 Transmit Antennas" 3GPP Draft; R1-083224—8 CRS Techniques, 3rd Generation Partnership Project (3GPP), Mobile Competence Centre ; 650, Route Des Lucioles ; F-06921 Sophia-Antipolis Cedex—France, No. Jeju; 20080812, Aug. 12, 2008, XP050316638.

* cited by examiner

ROBUST DECODING OF COMP TRANSMISSIONS

CLAIM OF PRIORITY UNDER 35 U.S.C. §119

The present application for patent claims benefit of U.S. Provisional Patent Application No. 61/230,068, entitled, "Robust Decoding of CoMP Transmissions," filed Jul. 30, 2009, and assigned to the assignee hereof and hereby expressly incorporated by reference herein.

BACKGROUND

Field

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In addition, in coordinated multiple point (CoMP) configurations, multiple base stations can transmit to and/or receive from a given mobile terminal, facilitating increased throughput and/or signal quality in communicating with the mobile terminal. In one example, base stations cooperating using CoMP can transmit substantially the same data, during substantially the same time periods, to a given mobile terminal.

SUMMARY

Certain aspects of the present disclosure provide a method for wireless communications. The method generally includes receiving a signal from access points in a coordinated multiple point (CoMP) communication set, the signal comprising a common reference signal (CRS) superimposed over data, determining CRS locations in the signal that correspond to the CRS, and decoding data from the signal based at least in part on the determined CRS locations.

Certain aspects of the present disclosure provide a method for wireless communications. The method generally includes determining reference signal (RS) resource locations related to one or more access points in a coordinated multiple point (CoMP) set transmitting a common reference signal (CRS), mapping data transmissions initially over a first set of resources that do not correspond to determined RS resource locations, and mapping remaining data transmissions over a second set of resources that correspond to determined RS resource locations.

Certain aspects of the present disclosure provide an apparatus for wireless communications. The apparatus generally includes at least one processor configured to receive a signal from access points in a coordinated multiple point (CoMP) communication set, the signal comprising a common reference signal (CRS) superimposed over data, determine CRS locations in the signal that correspond to the CRS, and decode data from the signal based at least in part on the determined CRS locations, and a memory coupled to the at least one processor.

Certain aspects of the present disclosure provide an apparatus for wireless communications. The apparatus generally includes at least one processor configured to determine reference signal (RS) resource locations related to one or more access points in a coordinated multiple point (CoMP) set transmitting a common reference signal (CRS), map data transmissions initially over a first set of resources that do not correspond to determined RS resource locations, and map remaining data transmissions over a second set of resources that correspond to determined RS resource locations, and a memory coupled to the at least one processor.

Certain aspects of the present disclosure provide an apparatus for wireless communications. The apparatus generally includes means for receiving a signal from access points in a coordinated multiple point (CoMP) communication set, the signal comprising a common reference signal (CRS) superimposed over data, means for determining CRS locations in the signal that correspond to the CRS, and means for decoding data from the signal based at least in part on the determined CRS locations.

Certain aspects of the present disclosure provide an apparatus for wireless communications. The apparatus generally includes means for determining reference signal (RS) resource locations related to one or more access points in a coordinated multiple point (CoMP) set transmitting a common reference signal (CRS), means for mapping data transmissions initially over a first set of resources that do not correspond to determined RS resource locations, and means for mapping remaining data transmissions over a second set of resources that correspond to determined RS resource locations.

Certain aspects provide a computer-program product for wireless communications, comprising a computer readable medium having instructions stored thereon, the instructions being executable by one or more processors. The instructions generally include instructions for receiving a signal from access points in a coordinated multiple point (CoMP) communication set, the signal comprising a common reference signal (CRS) superimposed over data, instructions for determining CRS locations in the signal that correspond to the CRS, and instructions for decoding data from the signal based at least in part on the determined CRS locations.

Certain aspects provide a computer-program product for wireless communications, comprising a computer readable medium having instructions stored thereon, the instructions being executable by one or more processors. The instructions generally include instructions for determining reference signal (RS) resource locations related to one or more access points in a coordinated multiple point (CoMP) set transmitting a common reference signal (CRS), instructions for mapping data transmissions initially over a first set of resources that do not correspond to determined RS resource locations, and instructions for mapping remaining data transmissions over a second set of resources that correspond to determined RS resource locations.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
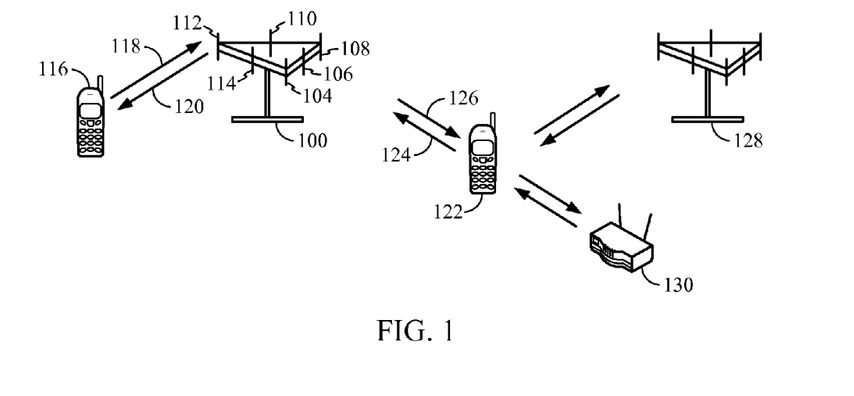
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology. Moreover, an access point may be a macrocell access point, femtocell access point, picocell access point, and/or the like.

In one example, as depicted, access terminal 122 can similarly communicate with access points 128 and/or 130. In one example, access point 128 can be a macrocell access point and access point 130 can be a smaller scale access point, such as a femtocell access point; however, it is to be appreciated that these access points 128 and 130 can, as well, be substantially any sort of access point. Access points 100, 128 and/or 130 can communicate with access terminal 122 in a coordinated multiple point (CoMP) mode such that access points 100, 128, and/or 130 transmit substantially the same data at substantially the same time to the access terminal 122. Similarly, the access points 100, 128 and/or 130 can receive transmissions from the access terminal 122. It is to be appreciated that access points 100, 128, and/or 130 can also communicate with one another, over a backhaul link (e.g., through a core wireless network or otherwise), over the air, and/or the like to facilitate CoMP communications.

In addition, access points 100, 128 and 130 can transmit a dedicated reference signal (DRS) to access terminal 122, which can be substantially the same DRS in CoMP communications. Access points 100, 128, and 130 can also transmit a common reference signal (CRS), which can be mapped over resources selected based on an identifier of a cell provided by the given access point. Access points 100, 128, and 130, and/or access terminal 122 can mitigate possible interference caused by CRS transmissions. In one example, access points 100, 128 and 130 can first map data transmissions over resource elements not used for transmitting CRS. In another example, access points 100, 128, and/or 130 can indicate the CoMP set of cells to the access terminal 122, and the access terminal 122 can determine when CRSs are transmitted based on identifiers of the cells and use this information in decoding. In yet another example, access points 100, 128 and 130 can transmit CRSs superimposed on data transmissions from other cells, and the access terminal 122 can utilize joint detection, interference cancellation, and/or the like to decode data transmissions.

Figure 2:
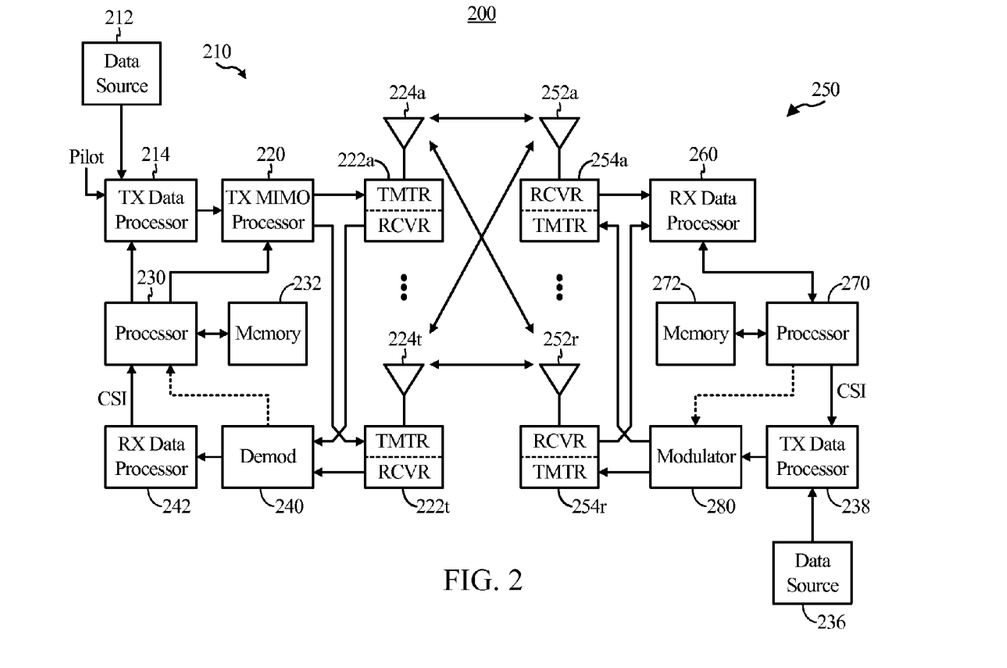
FIG. 2 illustrates a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprise Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 3:
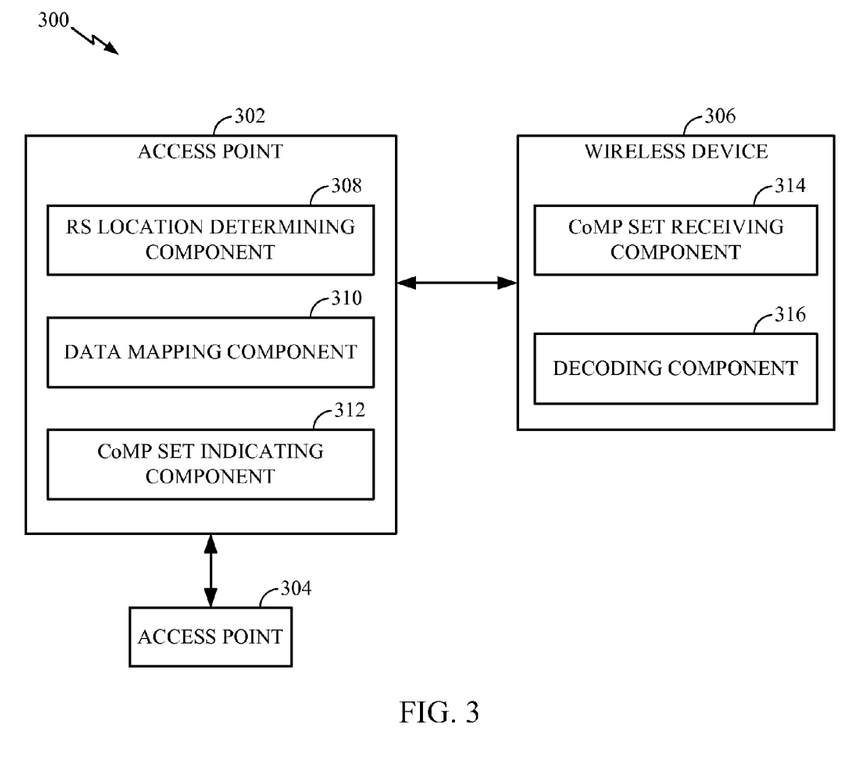
FIG. 3 illustrates an example system that facilitates mapping and decoding data in light of common reference signal (CRS) transmissions.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCE Control Channel Element
CCCH Common Control CHannel
CCH Control CHannel
CCTrCH Coded Composite Transport Channel
CP Cyclic Prefix
CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DRS Dedicated Reference Signal
DSCH Downlink Shared CHannel
DTCH Dedicated Traffic CHannel
E-CID Enhanced Cell IDentification
FACH Forward link Access CHannel
FDD Frequency Division Duplex
FSTD Frequency Switched Transmit Diversity
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
PMI Precoding Matrix Indicator
PRACH Physical Random Access CHannel
RACH Random Access CHannel
RLC Radio Link Control
RRC Radio Resource Control
RE Resource Element
RS Reference Signal
RTT Round Trip Time
Rx Receive
SAP Service Access Point
SDU Service Data Unit
SFBC Space Frequency Block Code
SHCCH SHared channel Control CHannel
SN Sequence Number
SUFI SUper FIeld
TA Timing Advance
TCH Traffic CHannel
TDD Time Division Duplex
TFI Transport Format Indicator
TM Transparent Mode
TMD Transparent Mode Data
TTI Transmission Time Interval
Tx Transmit
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel FIG. 3 illustrates a system 300 that may transmit data and CRSs together, in accordance with certain aspects of the present disclosure. As will be described in greater detail below, the data may be initially mapped to resource elements (REs) that do not contain CRS for any base stations in a CoMP set. After this initial mapping (e.g., after exhausting the REs that are not used for CRS), data may be mapped to REs that are used for CRS. Such mapping may facilitate effectively communicating data in a CoMP configuration despite transmission of CRSs.

As illustrated, system 300 may includes access points 302 and 304 that can each be a base station, femtocell access point, picocell access point, relay node, mobile base station, mobile device operating in a peer-to-peer communications modes, and/or the like, for example, that provide access to a wireless network.

Access points 302 and 304 may provide CoMP network access to wireless device 306. In one example, access points 302 and 304 can be in a CoMP set, which refers to a collection of access points that transmit to a given wireless device using CoMP. Wireless device 306 can be a mobile device, portion thereof, or substantially any device that can receive access to a wireless network. In addition, access points 302 and 304 can communicate with one another to provide the CoMP access (e.g., over a backhaul through a wireless network, over the air, etc.). It is to be appreciated, in an example, that access point 304 can comprise the components described in connection with access point 302 to provide similar functionality.

Access point 302 can include an RS location determining component 308 that receives (e.g., via a backhaul connection with other access points) or otherwise determines resource locations of RSs for access points in a CoMP set. The access point 302 may also include a data mapping component 310 that may be configured to select resource elements (REs) over which to map data transmissions. The AP 302 may also include a CoMP set indicating component 312 that may be configured to provide information regarding access points in a CoMP set to one or more wireless devices, including wireless device 306.

Wireless device 306 may include components configured to perform complementary operations to those components of the AP 302. As an example, the wireless device 306 may include a CoMP set receiving component 314 configured to receive information regarding a CoMP set of access points. The wireless device 306 may also include a decoding component 316 configured to decode data transmitted by the CoMP access points over a set of resources.

According to an example, the RS location determining component 308 may receive information regarding RS locations for other access points or related cells in a CoMP set, such as access point 304. The RS location determining component 308, for example, may receive this information from the access points, from a core wireless network, from wireless devices previously communicating with the access point 304, and/or the like. In another example, RS location determining component 308 may compute RS locations for the access points based on an identifier thereof and/or of a related cell.

In any case, the data mapping component 310 may initially map data to selected REs that do not correspond to RS locations (of any access point in the CoMP set). If, after this initial mapping, there is still data to transmit, this remaining data may be mapped to REs that do correspond to RS locations. In this regard, much of the data can be transmitted without interference from RSs transmitted by access point in the CoMP set.

According to certain aspects, the CoMP set indicating component 312 can provide information regarding access points of the CoMP set to wireless device 306 (such as identifiers of the access points and/or related cells).

CoMP set receiving component 314 can obtain the CoMP set information and determine one or more RS locations related to the access points in the CoMP set. For example, CoMP set receiving component 314 can determine RS locations based at least in part on access point or related cell identifiers (e.g., by applying the same algorithm used by the access point to determine when to transmit the RS, by providing the identifier to a core network component that assigns resources for transmitting RSs, etc.).

The decoding component 316 can decode data based at least in part on knowing the RS resource locations, such that it can decode the RS and data over the RS resource locations, for example. According to certain aspects, the decoding component 316 may derive rate matching schemes for tones located in the symbols comprising CRS tones and decode data based on determining the CRS tones.

According to yet another example, access points 302 and 304 may transmit data regardless of the CRS transmissions such that when CRSs are transmitted, data resources are superimposed with the CRS. With knowledge of the CRS locations (e.g., determined based on the participating access points), the wireless device 306 may, thus, apply joint detection or interference cancellation (or other techniques) to decode those data tones overlapping with CRS tones from other cells participating in CoMP data transmissions.

Figure 4:
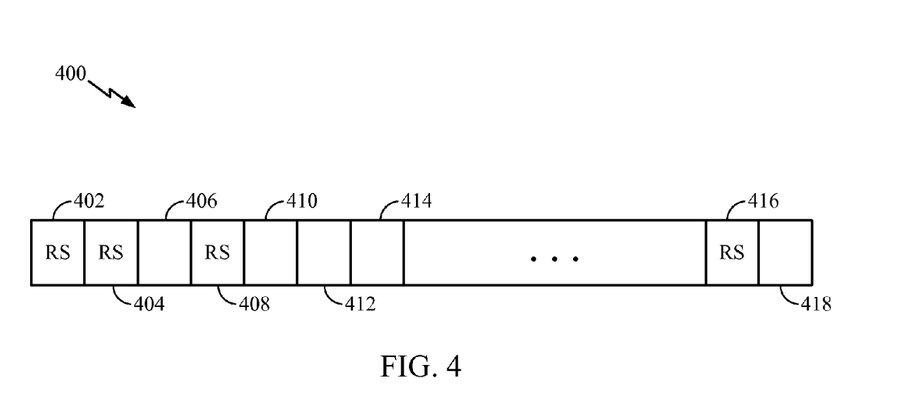
FIG. 4 illustrates an example portion of resource blocks that are allocated for data and CRS transmissions.

FIG. 4 illustrates an example portion of resource blocks 400 in a communication frame. Access points in a CoMP set, as described, can transmit CRSs over resources selected as a function of cell identifier. In this example, access points in the CoMP set can transmit RSs over resource blocks 402, 404, 408 and 416. As described in one example, an access point can receive information regarding RS locations for access points in the CoMP set.

As will be described in greater detail below, the access point may initially map data transmissions over resource blocks 406, 410, 412, 414 and 418 to avoid mapping during CRS transmissions, as described. In this example, devices receive data transmissions over the resource elements that are free from CRS interference in resource blocks 406, 410, 412, 414 and 418. It is to be appreciated that where additional resource blocks are needed, the access point can then map over the resource blocks corresponding to RS locations.

Figure 5:
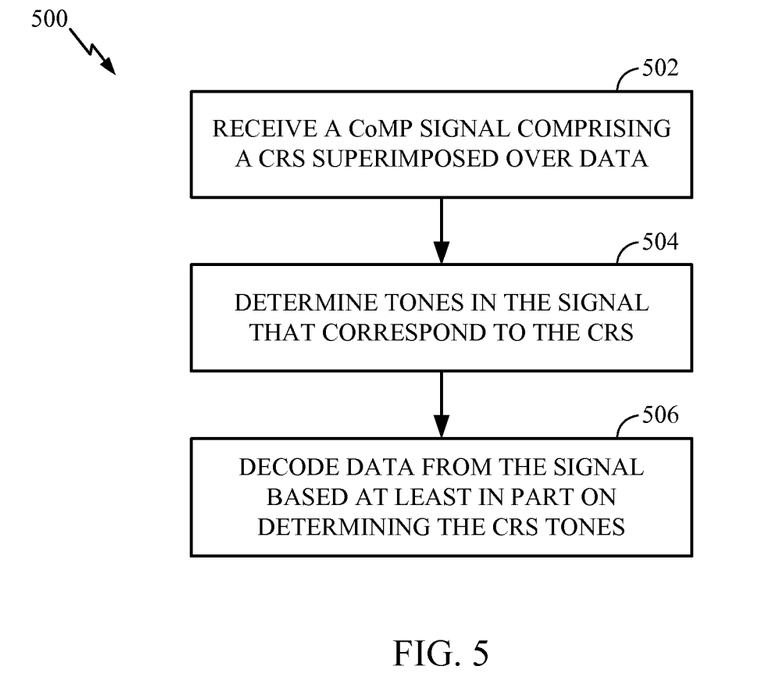
FIG. 5 illustrates an example methodology that facilitates decodes data over resources additionally used for CRS transmissions.

FIG. 5 illustrates a methodology 500 that decodes data from signals received from CoMP access points. The operations may be performed, for example, by the receiving and decoding components 314 and 316 of the wireless device 306. At 502, a CoMP signal comprising a CRS superimposed over data can be received. The CoMP signal can be received from various CoMP access points, as described. At 504, tones in the signal that correspond to the CRS can be determined.

As described above, the tones may be determined using joint detection, interference cancellation, and/or the like. In another example, the tones can be determined based at least in part on computing resource locations of the CRS based on received access point or related cell identifiers, as described. Moreover, for example, rate matching schemes related to the CRS tones can be derived or decoded based on the determined CRS resource locations. At 506, data can be decoded from the signal based at least in part on determining the CRS tones.

Figure 6:
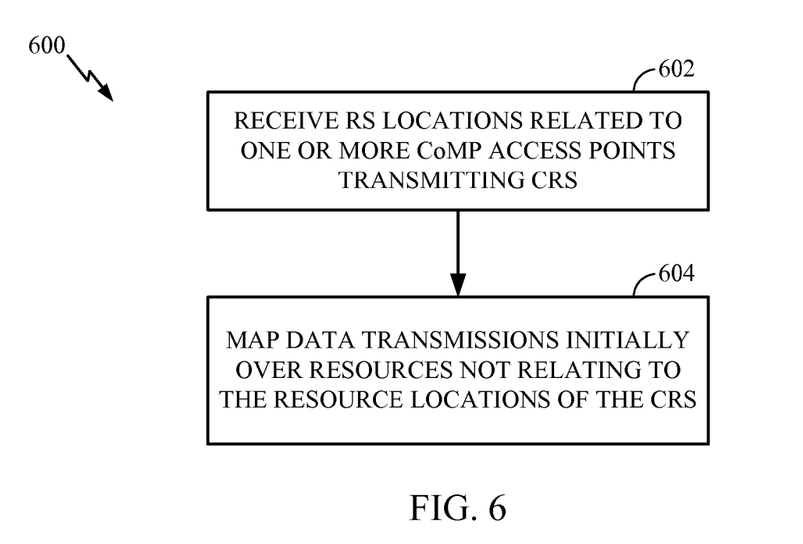
FIG. 6 illustrates an example methodology that facilitates initially mapping data over resources not utilized for CRS transmissions.

FIG. 6 illustrates a methodology 600 that facilitates mapping data for transmission over resources other than those used for transmitting CRS. The operations may be performed, for example, by the RS location determining and data mapping components 310 and 312 of the access point 302.

At 602, RS locations related to one or more CoMP access points transmitting CRS can be received. As described, the RS locations can be received from the CoMP access points, a wireless network, etc., and/or computed based on identifiers of access point in the CoMP set. At 604, data transmissions can be initially mapped over resources not relating to the resource locations of the CRS. Thus, for example, data can be mapped to initially avoid such resources to mitigate interference from the CRS of access points in the CoMP set.

Figure 7:
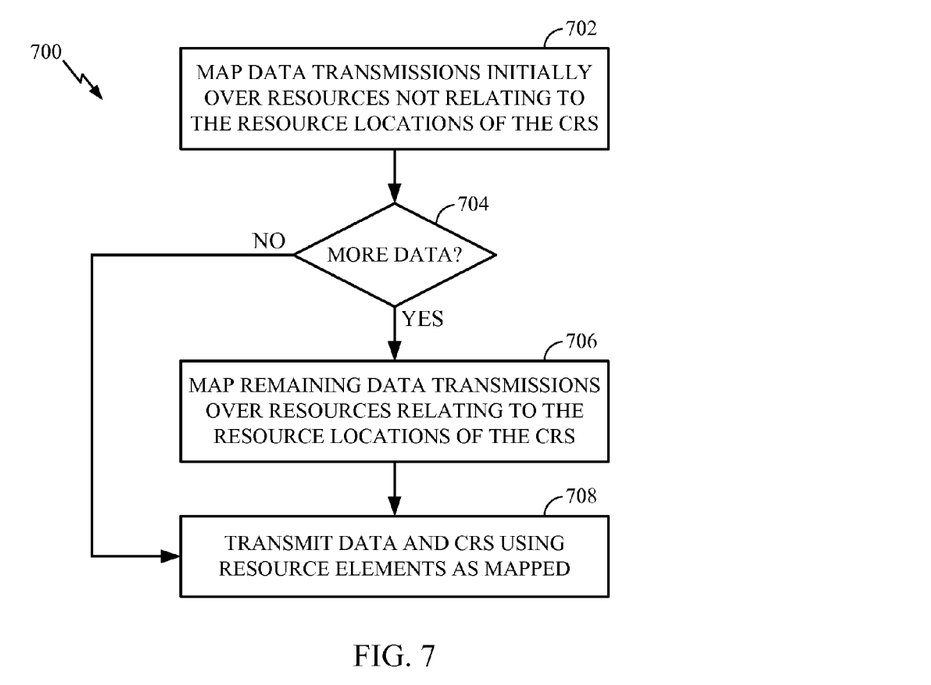
FIG. 7 illustrates an example methodology that facilitates initially mapping data over resources not utilized for CRS transmissions.

FIG. 7 illustrates example operations 700 that may be performed, for example, by the access point 302, to transmit data superimposed with CRS. The operations may be described with reference to FIGS. 8 and 9.

Figure 8:
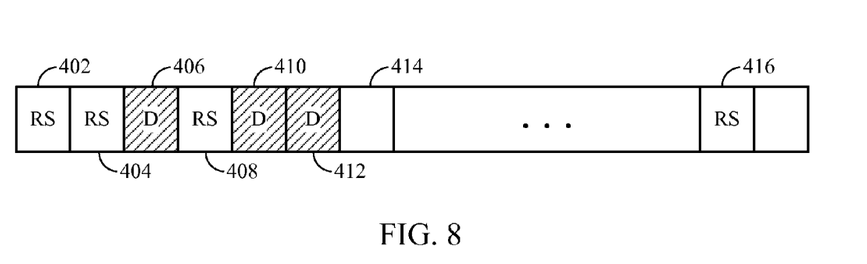
FIG. 8 illustrates an example portion of resource blocks that are allocated for data transmission, initially avoiding resource blocks used for CRS transmissions

The operations begin, at 702, by mapping data transmissions initially over resources not relating to the resource locations of the CRS. For example, as illustrated in FIG. 8, data (illustrated with a label "D" and cross-hatching) may be first mapped to REs 406 and 410 that do not relate to REs for CRS.

If there is not more data to map, as determined at block 704, the data may be transmitted (at 708) without using resources related to REs for CRS. On the other hand, if there is more data, at 706, the remaining data transmissions may be mapped over resources relating to the resource locations of the CRS.

Figure 9:
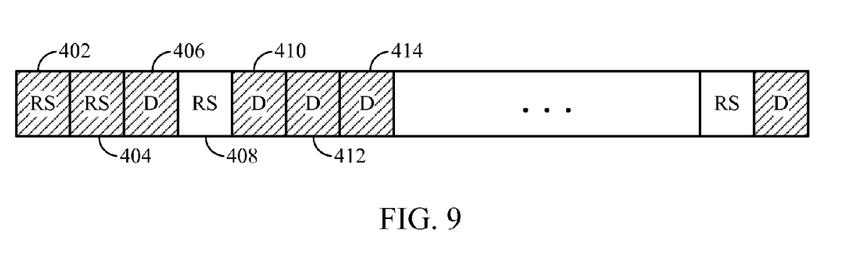
FIG. 9 illustrates an example portion of resource blocks that are allocated for data transmission, utilizing resource blocks used for CRS transmissions.

For example, as illustrated in FIG. 9, the additional data may be mapped to REs 402 and 404 that do relate to REs for CRS. According to certain aspects, in order to mitigate interference, a serving access point may first map data to RE locations related to CRS for other access points in a CoMP set.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the embodiments disclosed herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
receiving a signal from access points in a coordinated multiple point (CoMP) communication set, the signal comprising a common reference signal (CRS) from one access point in the CoMP communication set superimposed, in a same resource block, over data from another access point in the CoMP communication set;
determining CRS locations in the signal that correspond to the CRS;
deriving, based on a CRS transmission from a serving access point, rate matching schemes for CRS locations of non-serving access points in the CoMP communication set; and
decoding data from the signal based at least in part on the determined CRS locations and the derived rate matching schemes.

2. The method of claim 1, wherein the decoding comprises:
jointly detecting data and the CRS from the signal, based on knowledge of the determined CRS locations, to extract tones related to the CRS.

3. The method of claim 2, further comprising:
receiving an indication of access points participating in the CoMP communication set; and
determining the CRS locations based on the indication.

4. The method of claim 3, wherein decoding data from the signal comprises:
decoding data superimposed on CRS tone locations of the non-serving access points.

5. The method of claim 1, wherein the decoding comprises canceling interference in the signal to cancel tones related to the CRS.

6. A method for wireless communications, comprising:
in a first access point of multiple access points participating in a coordinated multiple point (CoMP) communication set,
determining reference signal (RS) resource locations used by each of the access points participating in the CoMP communication set that are transmitting a common reference signal (CRS);
mapping data transmissions for the first access point initially over a first set of resources that do not correspond to determined RS resource locations used by each of the access points transmitting CRS; and
mapping remaining data transmissions for the first access point initially over a second set of resources that correspond to determined RS resource locations used by each of the access points transmitting CRS other than a serving access point.

7. The method of claim 6, wherein mapping remaining data transmissions comprises mapping remaining data transmissions for the first access point over resources that correspond to determined RS resource locations used by each of the access points transmitting CRS only after exhausting resource locations that do not correspond to determined RS resource locations used by each of the access points transmitting CRS.

8. The method of claim 6, wherein the determining the RS resource locations comprises computing the RS resource locations used by each of the access points transmitting CRS based at least in part on identifiers of the access points transmitting CRS.

9. The method of claim 6, further comprising providing an indication to one or more access points of the multiple access points participating in the CoMP communication set.

10. The method of claim 9, wherein the indication is provided via a physical downlink control channel (PDCCH).

11. An apparatus for wireless communications, comprising:
at least one processor configured to:
receive a signal from access points in a coordinated multiple point (CoMP) communication set, the signal comprising a common reference signal (CRS) from one access point in the CoMP communication set superimposed, in a same resource block, over data from another access point in the CoMP communication set,
determine CRS locations in the signal that correspond to the CRS,
derive, based on a CRS transmission from a serving access point, rate matching schemes for CRS locations of non-serving access points in the CoMP communication set, and
decode data from the signal based at least in part on the determined CRS locations and the derived rate matching schemes; and
a memory coupled to the at least one processor.

12. The apparatus of claim 11, wherein the at least one processor is configured to decode is further configured to:
jointly detect data and the CRS from the signal, based on knowledge of the determined CRS locations, to extract tones related to the CRS.

13. The apparatus of claim 12, wherein the at least one processor is further configured to:
receive an indication of access points participating in the CoMP communication set; and
determine the CRS locations based on the indication.

14. The apparatus of claim 13, wherein the at least one processor is further configured to:
decode data superimposed on CRS tone locations of the non-serving access points.

15. The apparatus of claim 11, wherein the at least one processor is configured to decode is further configured to cancel interference in the signal to cancel tones related to the CRS.

16. An apparatus for wireless communications, comprising:
at least one processor utilized in a first access point of multiple access points configured to participate in a coordinated multiple point (CoMP) communication set, the at least one processor being configured to:
determine reference signal (RS) resource locations used by each of the access points participating in the CoMP communication set that are transmitting a common reference signal (CRS),
map data transmissions for the first access point initially over a first set of resources that do not correspond to determined RS resource locations used by each of the access points transmitting CRS, and
map remaining data transmissions for the first access point initially over a second set of resources that correspond to determined RS resource locations used by each of the access points transmitting CRS other than a serving access point; and
a memory utilized with the first access point, the memory being coupled to the at least one processor.

17. The apparatus of claim 16, wherein the at least one processor is configured to map remaining data transmissions is also configured to map remaining data transmissions for the first access point over resources that correspond to determined RS resource locations used by each of the access points transmitting CRS only after exhausting resource locations that do not correspond to determined RS resource locations used by the access point transmitting CRS.

18. The apparatus of claim 16, wherein the at least one processor is configured to determine the RS resource locations is further configured to compute the RS resource locations used by each of the access points transmitting CRS based at least in part on identifiers of the access point transmitting CRS.

19. The apparatus of claim 16, the at least one processor is further configured to provide an indication to one or more access points of the multiple access points participating in the CoMP communication set.

20. The apparatus of claim 19, wherein the indication is provided via a physical downlink control channel (PDCCH).

21. An apparatus for wireless communications, comprising:
means for receiving a signal from access points in a coordinated multiple point (CoMP) communication set, the signal comprising a common reference signal (CRS) from one access point in the CoMP communication set superimposed, in a same resource block, over data from another access point in the CoMP communication set:
means for determining CRS locations in the signal that correspond to the CRS;
means for deriving, based on a CRS transmission from a serving access point, rate matching schemes for CRS locations of non-serving access points in the CoMP communication set; and
means for decoding data from the signal based at least in part on the determined CRS locations and the derived rate matching schemes.

22. The apparatus of claim 21, wherein the means for decoding comprises:
means for jointly detecting data and the CRS from the signal, based on knowledge of the determined CRS locations, to extract tones related to the CRS.

23. The apparatus of claim 22, further comprising:
means for receiving an indication of access points participating in the CoMP communication set; and
means for determining the CRS locations based on the indication.

24. The apparatus of claim 23, wherein the means for decoding data from the signal comprises:
means for decoding data superimposed on CRS tone locations of the non-serving access points.

25. The apparatus of claim 21, wherein the means for decoding comprises means for canceling interference in the signal to cancel tones related to the CRS.

26. An apparatus for wireless communications, comprising:
means for determining reference signal (RS) resource locations used by access points participating in a coordinated multiple point (CoMP) communication set that are transmitting a common reference signal (CRS);
means for mapping data transmissions for a first access point in the CoMP communication set initially over a first set of resources that do not correspond to determined RS resource locations used by each of the access points transmitting CRS; and means for mapping remaining data transmissions for the first access point initially over a second set of resources that correspond to determined RS resource locations used by each of the access points transmitting CRS other than a serving access point,
wherein the means for determining the RS resource locations, the means for mapping data transmissions, and the means for mapping remaining data transmission are utilized in the first access point.

27. The apparatus of claim 26, wherein the means for mapping remaining data transmissions comprises means for mapping remaining data transmissions for the first access point over resources that correspond to determined RS resource locations used by each of the access points transmitting CRS only after exhausting resource locations that do not correspond to determined RS resource locations used by each of the access points transmitting CRS.

28. The apparatus of claim 26, wherein the means for determining the RS resource locations comprises means for computing the RS resource locations used by each of the access points transmitting CRS based at least in part on identifiers of the access points transmitting CRS.

29. The apparatus of claim 26, further comprising:
means for providing an indication to one or more access points of the multiple access points participating in the CoMP communication set.

30. The apparatus of claim 29, wherein the indication is provided via a physical downlink control channel (PDCCH).

31. A computer-program product for wireless communications, comprising a non-transitory computer readable medium having instructions stored thereon, the instructions being executable by one or more processors and the instructions comprising:
instructions for receiving a signal from access points in a coordinated multiple point (CoMP) communication set, the signal comprising a common reference signal (CRS) from one access point in the CoMP communication set superimposed, in a same resource block, over data from another access point in the CoMP communication set:
instructions for determining CRS locations in the signal that correspond to the CRS;
instructions for deriving, based on a CRS transmission from a serving access point, rate matching schemes for CRS locations of non-serving access points in the CoMP communication set; and
instructions for decoding data from the signal based at least III part on the determined CRS locations and the derived rate matching schemes.

32. The computer-program product of claim 31, wherein the instructions for decoding comprise:
instructions for jointly detecting data and the CRS from the signal, based on knowledge of the determined CRS locations, to extract tones related to the CRS.

33. The computer-program product of claim 32, further comprising:

instructions for receiving an indication of access points participating in the CoMP communication set; and
instructions for determining the CRS locations based on the indication.

34. The computer-program product of claim 33, wherein the instructions for decoding data from the signal comprise:
instructions for decoding data superimposed on CRS tone locations of the non-serving access points.

35. The computer-program product of claim 31, wherein the instructions for decoding comprise instructions for canceling interference in the signal to cancel tones related to the CRS.

36. A computer-program product for wireless communications, comprising a non-transitory computer readable medium having instructions stored thereon, the instructions being executable by one or more processors utilized in a first access point of multiple access points configured to participate in a coordinated multiple point (CoMP) communication set, and the instructions comprising:
instructions for determining reference signal (RS) resource locations used by each of the access points participating in the CoMP communication set that are transmitting a common reference signal (CRS);
instructions for mapping data transmissions for the first access point initially over a first set of resources that do not correspond to determined RS resource locations used by each of the access points transmitting CRS; and
instructions for mapping remaining data transmissions for the first access point initially over a second set of resources that correspond to determined RS resource locations used by each of the access points transmitting CRS other than a serving access point.

37. The computer-program product of claim 36, wherein the instructions for mapping remaining data transmissions comprise instructions for mapping remaining data transmissions for the first access point over resources that correspond to determined RS resource locations used by each of the access points transmitting CRS only after exhausting resource locations that do not correspond to determined RS resource locations used by each of the access points transmitting CRS.

38. The computer-program product of claim 36, wherein the instructions for determining the RS resource locations comprise instructions for computing the RS resource locations used by each of the access points transmitting CRS based at least in part on identifiers of the access points transmitting CRS.

39. The computer-program product of claim 36, further comprising:
instructions for providing an indication to one or more access points of the multiple access points participating in the CoMP communication set.

40. The computer-program product of claim 39, wherein the indication is provided via a physical downlink control channel (PDCCH).

* * * * *